United States Patent [19]

Sefton, Jr.

[11] Patent Number: 4,831,384

[45] Date of Patent: May 16, 1989

[54] POLARIZATION-SENSITIVE RECEIVER FOR MICROWAVE SIGNALS

[75] Inventor: Harry B. Sefton, Jr., Canoga Park, Calif.

[73] Assignee: Tecom Industries Incorporated, Chatsworth, Calif.

[21] Appl. No.: 200,365

[22] Filed: May 31, 1988

[51] Int. Cl.[4] .................... G01S 13/00

[52] U.S. Cl. .................... 342/188; 342/361; 343/756; 343/909

[58] Field of Search .................... 342/188, 183, 361; 343/909, 756

[56] References Cited

U.S. PATENT DOCUMENTS

| | | | |
|---|---|---|---|
| Re. 26,292 | 10/1967 | Bradford et al. | 342/44 |
| 2,885,675 | 5/1959 | Simon et al. | 343/756 |
| 2,942,262 | 6/1960 | Shanks et al. | 343/756 |
| 2,989,746 | 6/1961 | Ramsay | 343/756 |
| 3,049,708 | 8/1962 | Berkowitz | 343/756 |
| 3,148,367 | 9/1964 | Ochiai | 342/181 |
| 3,362,025 | 1/1968 | Mori | 342/44 |
| 3,366,952 | 1/1968 | Mori | 342/44 |
| 3,488,655 | 1/1970 | Fortner | 342/44 |
| 4,081,803 | 3/1978 | Dempsey | 343/909 X |
| 4,335,387 | 6/1982 | Salvat et al. | 343/756 |
| 4,503,379 | 3/1985 | Raiman | 343/909 X |
| 4,728,961 | 3/1988 | Bossuet et al. | 343/909 X |

*Primary Examiner*—Thomas H. Tarcza

*Assistant Examiner*—John B. Sotomayor

*Attorney, Agent, or Firm*—Donald Diamond

[57] ABSTRACT

The invention relates to a receiver for microwave signals—either emitted by a body or reflected therefrom—capable of analyzing the polar distribution of the signal strength by measuring the strength of the incoming signal after it had been passed through a horizontal, polarizing filter disk with three distinct transmission regions. One region transmits the entire signal reflected from a planar mirror positioned substantially at 45 degrees to the horizon and rotated on a vertical axis; the second and third regions in the planar electro-optical filter are defined by parallel grid lines, formed by electrical conductors opaque to the reflected radiation and aligned in mutually orthogonal arrays in the two regions respectively, so that each grid alignment becomes transparent to one polarization of the radiation incident thereon. The filter is rotationally slaved to the reflecting mirror and the grid lines of one region are parallel to the horizon, as reflected onto the horizontal plane of the filter assembly, and admit the horizontally polarized component of the incoming signal; the grid lines of the other region admit the vertically polarized component. Comparison of the unmodified incoming signal with the horizontal and vertical components thereof permits the characterization of the emitting, or reflecting, antenna, or conductive body acting as an antenna, which is the source of the detected microwave energy.

20 Claims, 4 Drawing Sheets

POLARIZATION-SENSITIVE RECEIVER FOR MICROWAVE SIGNALS

BACKGROUND OF THE INVENTION

The instant invention relates to detectors for microwave radiation and, more particularly, to radar antennas sensitive to the polarization of the received signal.

The utilization of microwave radiation to locate and track moving objects has been known for many years and forms the basis of the many active radar systems, ranging from those tracking spacecraft to hand-held police speed-measuring units for automobiles. Such units typically emit a train of pulses at microwave frequencies from an emitting antenna and use the same antenna—generally in the form of a paraboloid—to detect echoes reflected from the target. Such units use (a) the time delay, between a given pulse in the transmission and its echo, to determine distance, (b) the Doppler effect to determine speed, and (c) antenna position to determine the line of bearing (LOB) to the target.

The instant invention addresses itself to an additional item of information which may be derived from a reflected signal, or, a priori, from a signal purposely or intrinsically emitted by the target being tracked. This information relates to the polarization of the received microwave beam. Electromagnetic radiation can be viewed as composed of two orthogonally superimposed trains of waves, e.g., by referring to such trains as being horizontally and vertically polarized in a terrestrial frame of reference. It is possible, in the case of a deliberately emitted signal beam, to define the proportion of energy sent out in the horizontal component and in the vertical component independently, by appropriately shaping the emitting conductor or array.

In the case of a reflected signal, the shape and movement of the reflecting body—and in some instances its physical make-up—can alter the polarization pattern of the radiation returned to the illuminating antenna. Whatever the reason for the variation in the polarization of a microwave signal, the knowledge of this factor can help to identify and characterize the body which is emitting it, either actively or by reflecting a beam originating elsewhere.

Conventional radar units,.being co-polar in both transmit and receive modes, cannot distinguish between different polarization patterns of incoming radiation. The commonly utilized parabolic antenna destroys this information by focusing the signal onto a single receiver, or feed; and other antenna forms, even if more sensitive to particular directions of polarization cannot, in the absence of a directional reference, provide meaningful information on the source.

Since it is a prime purpose of most radar microwave receivers to derive angle and range information on a particular target, the prior art has failed to provide any effective devices or components of a practicable nature to perform the task of differentiating polarization patterns. Proposals to employ dual-polarized feeds in conjunction with an orthomode junction to separate orthogonally polarized signals into separate channels for further processing have not been a requirement of radar systems.

The requirement for polarization information is most acute in the fields of passive sensing—associated with electronic warfare, countermeasures, reconnaissance and surveillance systems—where information is sought on all characteristics of a detected signal, including frequency, band width, pulse width, repetition rate, as well as polarization data.

OBJECTS OF THE INVENTION

It is, therefore, a principal object of the invention to provide a receiving system for microwave radiation capable of comparing the relative strengths of two, mutually orthogonal, linear wave components therein, and thereby determine the dominant polarization of the emitting and/or reflecting object which is the source of the radiation.

It is another object of the invention to teach the construction of microwave receiving systems sensitive to the direction of polarization of incoming radiation, and adaptable to different methods of analyzing the received signal.

It is yet another object of the invention to provide a microwave receiver of the aforementioned character without requiring the employment of moving components in the sensing devices therein, and thereby obviating the need for the use of rotating signal waveguide joints.

It is a still further object of the invention to teach the construction of analyzing filters for incident microwave radiation employing parallel-bar conductor arrays as polarizing filters.

It is also an object of the invention to teach the synchronization, by mechanical and/or electromechanical means, of the rotation, or scanning, of the reflecting mirror with the polarizing filter assembly, in a microwave detector of the type and kind described; thereby maintaining a constant relationship between the signal strengths transmitted through the several regions of the polarizing filter disk, independent of the instantaneous look-angle of the reflecting mirror relative-to the line-of-sight to the emitting source.

It is also an object of the invention to provide microwave detectors employing planar reflecting mirrors slaved to the rotation of a primary antenna of conventional shape.

SUMMARY OF THE INVENTION

The invention attains the aforementioned objects by providing a planar substantially rectangular mirror impelled into rotational motion about a principal axis. In a preferred embodiment of the invention, the reflecting mirror is slaved to a conventional rotating microwave antenna, e.g., in the form of a partial paraboloid with a feed at the focus to provide additional frequency coverage.

The mirror is positioned at an angle so that incoming microwave radiation is caused to be reflected into the sensor antenna along the mirror axis of rotation. The mirror angle depends upon whether the incoming signal is above, below or on the plane of the receiving antenna system. In an illustrative embodiment, the mirror is positioned at substantially 45 degrees with respect to the principal axis, so that originating radiation, when the mirror is facing the line of sight to the originating source, is reflected into a beam substantially parallel with the principal rotational axis. Suitably, the mirror is substantially centered on the rotational axis, itself, so that the reflected beam is also substantially centered on this geometric feature.

The beam of incoming radiation reflected by the planar mirror is caused to pass through a filter with three distinct regions with differing transmission characteristics. Of the three regions, one is transparent to all polarizations of the incoming radiation, a second is substantially transparent only to that portion of the radiation which was originally emitted by the source with a horizontal polarization, and the third is substantially transparent only to the vertically polarized component of the beam. The polarization-sensitive regions of the filter are created by conductors positioned in parallel arrays, with the conductors defining the second and third regions being substantially orthogonal to one another. By suitable dimensioning and spacing of these conductors, it is possible to create effective electro-optical filters with great discrimination in passing radiation with differing polarizations.

The aforementioned filter assembly is rotated synchronously with the antenna/mirror assembly—by mechanical coupling, or by means of slaved drive systems—so that the parallel conductor arrays always maintain the same attitude to imaginary horizontal and vertical generating lines in the surface of the mirror, independently of their instantaneous rotational position. In a preferred mode of development of the invention, this is accomplished by substantially centering a substantially circular, flat disk of a material displaying high transmissivity to microwave radiation on the conjoint axis of rotation of the antenna/mirror assembly and entraining the same into rotational motion synchronized therewith. A central, circular region of the disk is left without any imprint of any conductive material thereon, and forms the first, all-pass, region of the filter. A second region, in the form of a concentric annulus abutting on the first region, is imprinted with a set of parallel lines defined by a conductive material such as a metallic deposit or etched away conductive surface; while the third region is similarly defined, except that the filter lines are in an alignment substantially orthogonal to the array in the second region, and that the third region abuts the outer perimeter of the second region.

Receiving sensors—in the form of circularly polarized microwave horns—are positioned behind each of the three regions. Since the regions are concentric with the axis of rotation of the antenna assembly, the sensors may be in fixed positions behind the filter disk and may be of the conventional, circularly polarized kind, equally sensitive to radiation of any inherent direction of polarization.

In actual use, the sensor located behind the all-pass zone of the filter is used to scan for and detect a particular source. When a source of interest has been detected, the outputs from the sensors behind the vertically and horizontally polarized zones of the filter are sampled to obtain a set of three signal intensities from the three zones for comparison and processing.

The receiver behind the central, all-pass, region will be exposed to the full intensity—as expressed in microwave energy per unit surface area—of the incoming beam. The to the, respectively, two outer regions will be exposed horizontally and vertically polarized components which make up the total signal.

By comparing the two filtered signals with the total signal, it is possible to determine the principal plane of polarization of the incoming beam; and with continued scanning to detect any variation in the relative intensity of the two components. Once the three signals, derived in the same manner and representing directly comparable signal strengths unaffected by any characteristic of the apparatus, itself—save in the actual strength of the total signal beam—are made available, many methods of analysis may suggest themselves to one skilled in the art of deciphering the information contained in a beam of microwave radiation.

DESCRIPTION OF THE DRAWING

The preferred embodiment of the invention, and variants thereof, will be described below with reference to the accompanying drawing, in which.

DETAILED DESCRIPTION

Figure 1:
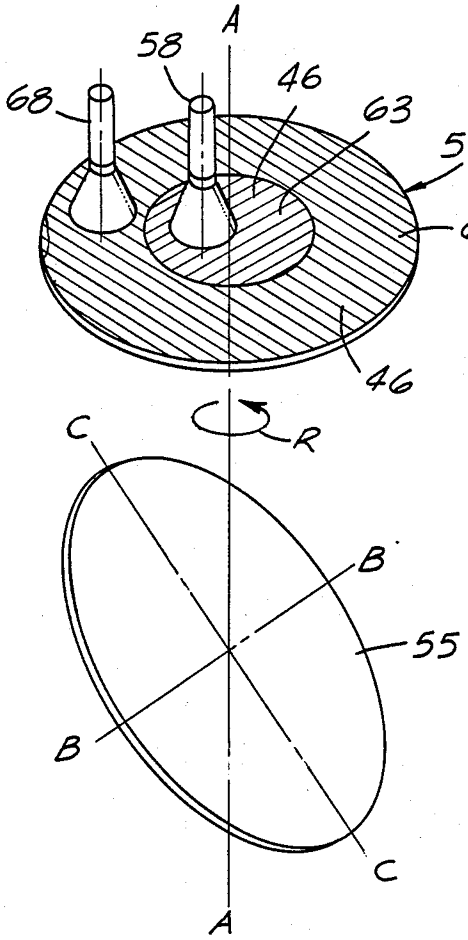
FIG. 1 is a diagram representing the principal elements of the receiver of the invention, for detecting and analyzing microwave radiation and for determining its dominant mode of linear polarization.

FIG. 1 is a diagrammatic representation of the principal components forming the polarization-sensitive microwave radiation receiver of the invention, including a horizontal, circular filter disk 57 mounted for rotation, in the sense of arrow "R", on a vertical axis of rotation A—A. The disk 57 comprises a thin membrane material that is substantially transparent to radiation in the microwave frequency band.

It should be noted that the terms "vertical" and "horizontal" in this context need not refer to gravitationally defined directions—merely to orthogonally oriented axes—albeit in the preferred mode of use of the invention the microwave radiation receiver is likely to be oriented to scan the horizon around a substantially vertical axis.

The filter disk is subdivided into concentric regions 62 and 63, each defined by a plurality of parallel conductors 46 attached to the disk 57. The sets of parallel conductors in the outer region 62 are orthogonal to the array of similar parallel conductors in the inner region 63.

Also mounted for rotation on the axis A—A is a flat mirror 55 so constructed that it acts as an electro-optical reflector for radiation in the microwave frequencies; suitably as a panel of polished metallic alloy. In the schematic embodiment of FIG. 1, the mirror 55 has been configured as a planar ellipse and is mounted at substantially 45 degrees with respect to a horizontal plane orthogonal to the axis of rotation A—A. Suitably, the vertical projection of the mirror 55 is greater than the circular outline of the filter disk 57, but is, at least, equal thereto.

The mirror 55 is synchronously driven—in the sense of the rotational arrow "R"—with the filter disk 57, so that a horizontally aligned minor axis B—B of the mirror 55 remains parallel, at all angular positions of rotation, with the array of parallel conductors defining one of the two filter regions, suitably inner region 63. Similarly, the array of conductors in the outer filter region 62 remains aligned with vertical elements in the mirror 55, including major axis C—C therein.

While the mirror 55 is shown in FIG. 1 as lying below filter disk 57 and being inclined at substantially 45 degrees so as to reflect a horizontally incident beam of radiation on its surface vertically through the filter disk, it is evident that the same effect can be attained by a kinematic inversion of these elements, so that the filter disk is below the mirror on the axis of rotation and the radiation is reflected downwardly therethrough.

As radiation originating on the horizon is reflected through the filter disk 57, vertically polarized components therein will tend to pass through the conductor array of region 62 with little attenuation. Similarly, horizontally polarized components of the incident microwave beam will readily pass through the region 63; the converse, in both regions, is not so and radiation with electrical field vectors parallel to the array of conductors will be greatly reflected and, therefore, attenuated by the two zones of the filter disk. Consequently, microwave receiving sensors 58 and 68—statically positioned above the filter regions 63 and 62, respectively—will be exposed to two orthogonally polarized components of the incoming beam.

Measuring the signal strengths collected, respectively, by the receivers 58 and 68 and comparing them will clearly indicate the relative polarization of the received signal. The ratio of the signal strengths to which the receivers 58 and 68 are exposed is independent of any angular differential between the location of the emitting source and the instantaneous view-angle of the mirror 55 as it scans the horizon, albeit the greatest signal magnitudes will be obtained when the mirror faces the emitter directly.

The receivers 58 and 68 are exposed to radiation which, although derived from a signal with a particular polarization plane, varies in direction of polarization as a result of the rotation of the mirror 55 and of the filter disk 57. Consequently it is important that these sensors be insensitive to such variation, and be selected from the class of microwave receivers (e.g. antennas) having circular polarization and low axial ratio.

Figure 1A:
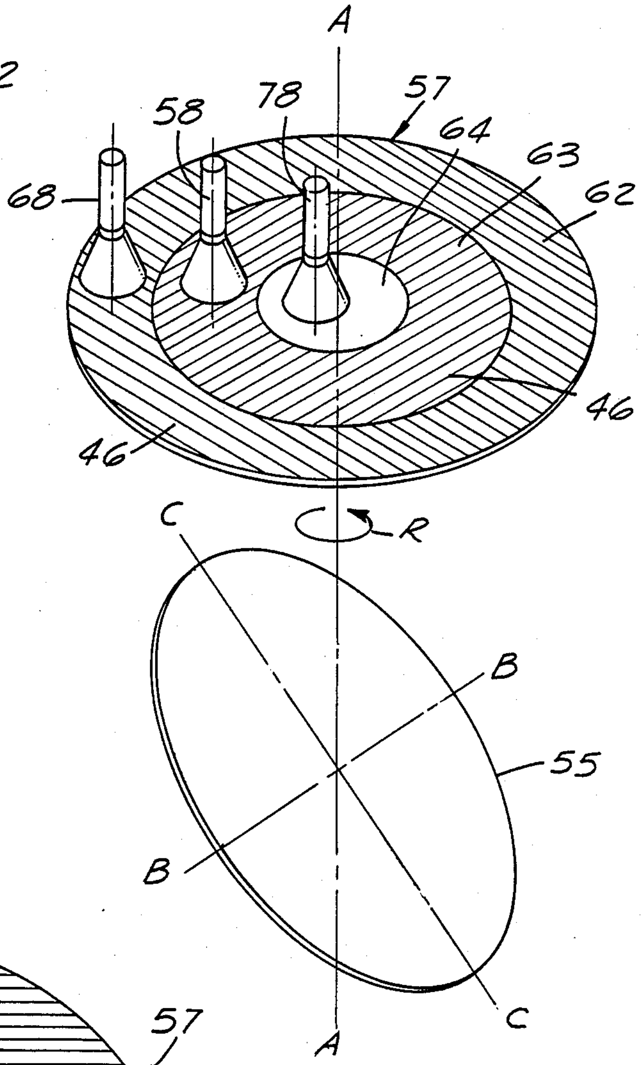
FIG. 1A is a diagrammatic representation corresponding to that of FIG. 1, except that the filter therein is composed of three regions of differing transmission character.

FIG. 1A is a diagrammatic representation of a microwave receiver of the invention and is similar to the device shown in FIG. 1, except that the filter disk 57 is provided with three concentric regions of differring transmission character; a central region 64 with no obstacle to the transmission of any component in the signal reflected from the mirror 55, and regions 63 and 62 outboard of the central region 64 defined by arrays of grid lines as described with reference to FIG. 1.

The addition of a sensor 78—in the path of radiation passing through the central region 64—complements the filter 57, permitting the measurement of the total signal emanating from the source being analyzed, along with its constituent, mutually orthogonally polarized components.

Figure 2:
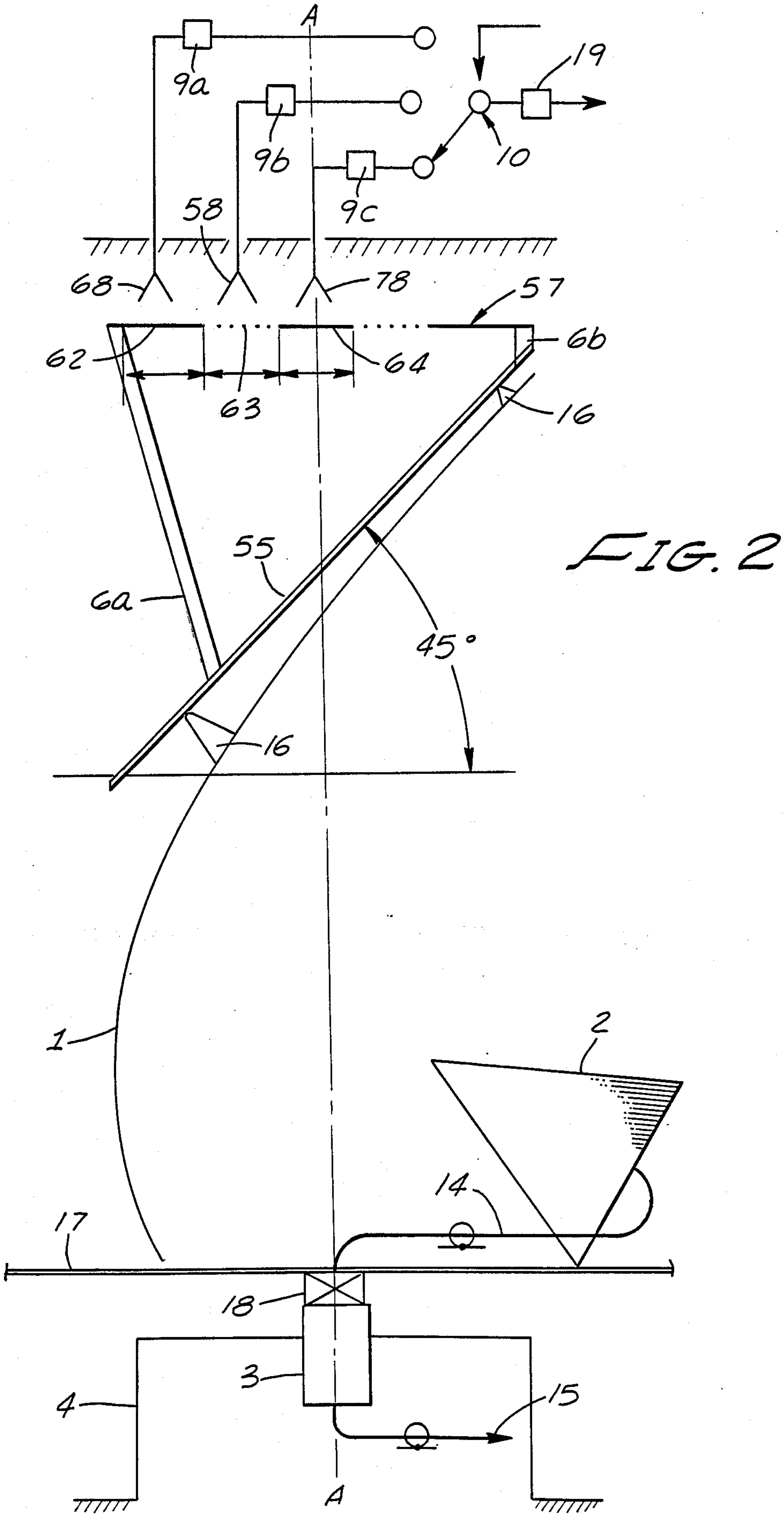
FIG. 2 is a schematic representation of the polarization-sensitive microwave receiver of the invention—integrated with a conventional receiver for radar signals—in elevation.
Figure 4:
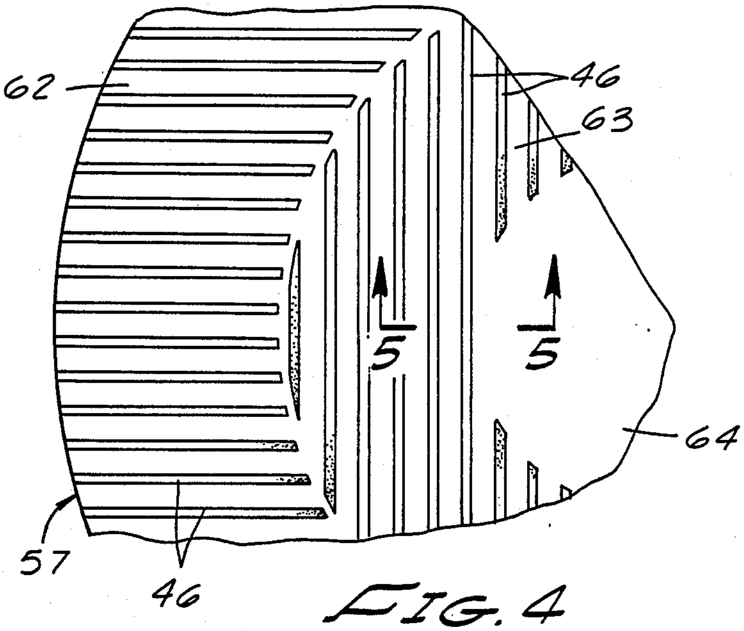
FIG. 4 is an enlarged, partial section of the filter disk shown in FIG. 3.

FIG. 2 is a schematic representation of a preferred embodiment of the invention, incorporating an antenna 1, in the form of a parabolic reflector for electromagnetic radiation, and a planar mirror 55. The antenna 1 and the mirror 55 are joined by supports 16 and are mounted for rotation about a vertical axis A—A. The antenna 1 is positioned with its focal axis in a horizontal plane, while the mirror 55 is canted with respect to that plane at an angle of 45 degrees.

The mirror 55 is secured to the rear, non-focusing surface of the antenna 1 and is exposed to any incoming microwave beam during a complete rotation of the sensor assembly around the axis A—A.

Rotational movement for the antenna 1, and for mirror 55, is derived from a rotator 4, suitably in the form of an electric motor and gearbox combination. The rotator 4 impels a turntable 17 onto which the mechanically interconnected antenna 1 and mirror 55 are mounted, along with microwave feed device 2.

Incident electromagnetic radiation striking the focusing surface of the antenna 1 is collected by the feed 2, whose receiving portion is located at the geometric focus of the parabolic curve defining the surface of the antenna. The collected electromagnetic signal is transferred to an output port 15 via coaxial transmission lines 14, with a rotating coaxial joint 3 formed at a bearing 18 supporting the turntable 17.

A horizontally aligned circular filter disk 57, constructed from a dielectric material transparent to electromagnetic radiation, is secured to the mirror 55 by means of dielectric supports *6a, 6b*. The disk is centered on the vertical axis A—A and rotates synchronously with the mirror 55, and, therefore, with the antenna 1.

A central, circular zone 64 in the face of disk 57 is left unobscured, so that electromagnetic radiation striking the mirror 55 in its central portion, and reflected upwardly toward the region 64, may pass without material diminution of its energy into a receiver 78, mounted in a stationary position above the region 64 and facing the mirror 55 therethrough. The receiver 78, and identical receivers 58 and 68—whose functions will be described below—are in the form of circularly polarized horns and are equally sensitive to all components of an incoming microwave beam, irrespective of the incident polarizations.

A vertically polarizing filter region 63, in the form of an annulus abutting the central zone 64, is defined by a series of parallel conductors imprinted onto the surface of the disk 57. These conductors are aligned with notional horizontal lines in the surface of the mirror 55, and serve to permit passage of horizontally polarized components of the incoming beam while blocking the transmission of the vertically polarized components. As a result of the definition of the region 63 in this manner, the receiver 58 which is positioned above the region 63 and facing downwardly toward the mirror 55 will only be collecting microwave energy which had been in the horizontally polarized components of the beam reflected by the mirror 55.

A horizontally polarizing filter region 62 is also provided in the disk 57, in an annular region outboard from the region 63 and extending toward the edge of the disk. The region 62 is similar in construction to the region 63, except that the conductors which define it are orthogonal to the similar conductors in the vertically polarizing filter region 63 and are parallel to vertical generating lines in surface of the mirror 55. The receiver 68—identical to the receivers 58 and 78 and similarly mounted in a stationary position above the filter disk, behind the region 62—is, consequently, exposed to the vertically polarized components, in the incoming radiation beam.

Due to the synchronization in the rotational motions of the mirror 55 and of the filter disk 57, the relative strengths of the three signals derived from the receivers 78, 58 and 68 do not vary with the changing angle of incidence of the received beam as the rotator 4 impels the detector assembly into its circulatory motion. Of course, the strength of the signal will be greatest when the mirror 55 squarely faces the point of origin of the incoming microwave beam.

The microwave energy captured by the receivers 78, 58, and 68 is suitably directed toward analytical instrumentation—capable of determining the relative strengths of the three signals—by means of waveguide transmission lines 9*a*, 9*b* and 9*c*. In a particular embodiment of the invention, a single analytical instrument—at its simplest a microwave diode coupled to a microammeter—can be used to read all three signal strengths, by the interposition of a single-pole, three-position switch 10 between the waveguides 9 and a single output transmission line 19.

Figure 3:
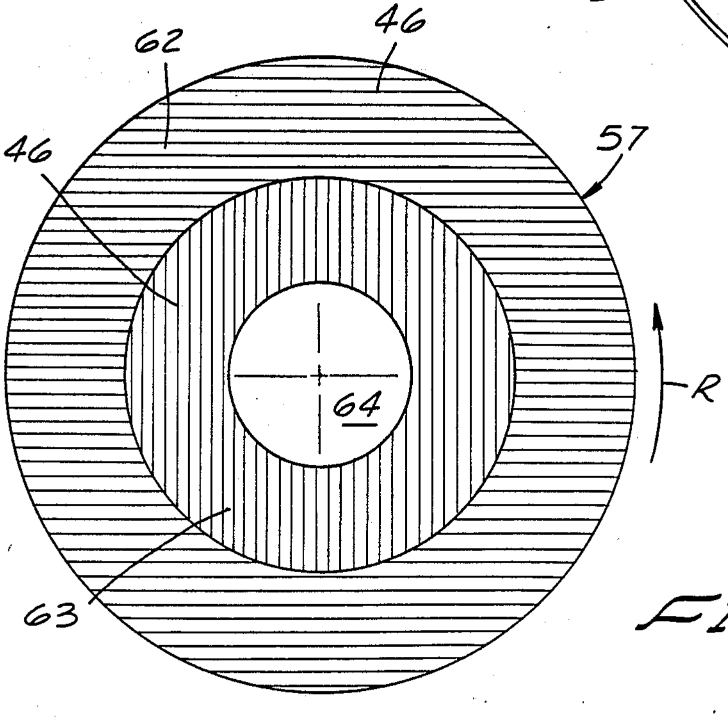
FIG. 3 is a planar view of a filter disk for discriminating between orthogonal polarization directions, as employed in the receiver of the invention.

FIG. 3 is a schematic plan view of the filter disk 57 shown in FIG. 1A. The disk, or its functional equivalents, may be constructed in several ways but it is foreseen that a preferred embodiment will involve a circular plate 57 of low loss, low dielectric strength material—Teflon or Mylar are suitable substrates—with conductive grids 46 to define regions 62 and 63 either printed or photoetched onto a surface of the plate or formed of wires or strips glued to it, or embedded into the plate in the case of a molded plastic disk. One alternate method of construction is to utilize air as the dielectric and to form the grids in space out of wires, either continuously bent or welded, or soldered, into the parallel arrays of regions 62 and 63.

The ability of the filter regions 62 and 63 to pass radiation polarized perpendicular to the conductor arrays is influenced by the geometrical properties of the conductors forming such grids. Both theoretical and experimental studies have indicated that it is preferable to provide a spacing—centerline to centerline of adjacent conductors—between grid lines equal to, or smaller (preferably by an order of magnitude) than, one-half of the wave length of the microwave radiation to be analyzed. Similar considerations lead to the desideratum that the spacing between adjacent conductors be much greater than their physical width—the dimension obstructing the passage of microwave radiation through the disk 57—preferably by an order of magnitude.

It is foreseen that the greatest utility of the instant invention will lie in analyzing incoming signals typically in the "K" and "A" bands—respectively occupying the 18 to 26 GHz and 26 to 40 GHz regions in the electromagnetic spectrum—with wave lengths ranging from 0.7 to 0.3 inch to a single-digit approximation). For application to such frequencies—generally referred to as millimeter waves—it is appropriate to utilize line widths ranging from approximately 0.025 inch to about 0.005 inch, with corresponding spacings from 0.100 to 0.030 inch. Typical dimensions are in the region of 0.040 inch in line spacing and 0.012 inch in conductor width.

Figure 6:
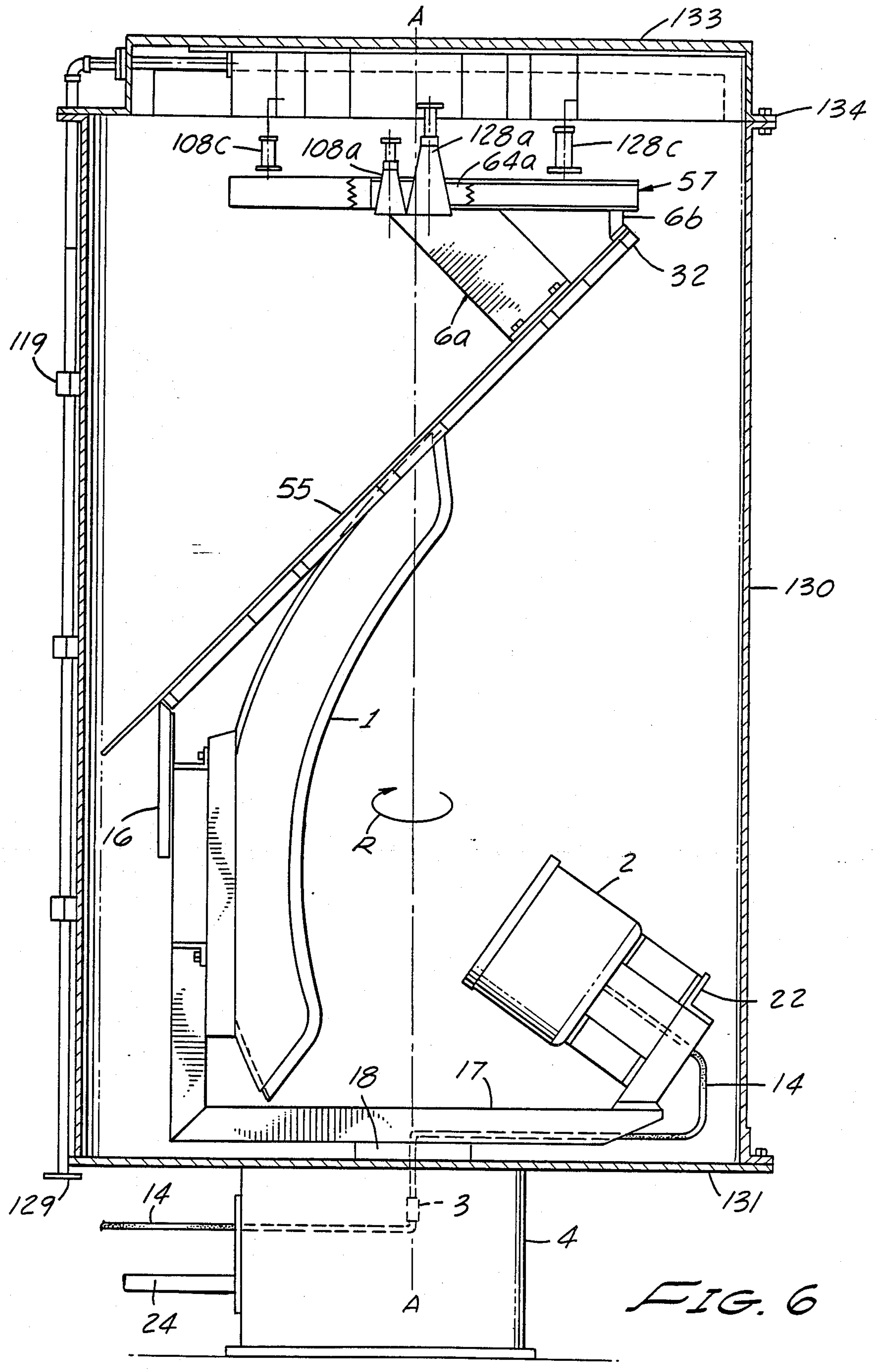
FIG. 6 is an elevational view, in partial section, of a microwave receiver of the invention, including a radiation-permeable housing.

FIG. 6 is an elevational view, in partial section, of a microwave signal receiver of the invention, designed to operate in two separate frequency bands within the electromagnetic spectrum. The device incorporates a principal microwave antenna 1—in the form of a partial paraboloid of revolution with a focal axis extending horizontally toward the horizon and a suitable collector or feed 2 for microwave energy located at the focus of the receiver. The antenna 1 and its collector 2 are mounted on a turntable 17 which is journalled for rotational movement in a bearing 18, with the collector being on adjustable mountings 22.

Rotation of the turntable. 17—and the components mounted thereon—is achieved by a gearmotor 4 powered from an electrical power supply cable 24. Microwave radiation received by the collector 2 is channelled towards instrumentation/display and analytical devices—not shown and not forming part of the instant invention—by means of a coaxial conductor 14 which passes through a rotary coaxial joint 3 within the gearmotor assembly 4.

A mounting plate 32 is supported partly by the rear, inactive, face of the antenna 1 and partly by a support bar 16 secured to the turntable 17. A flat mirror 55—suitably with a polished metallic surface—is secured to the mounting plate 32 which is tilted at 45 degrees from the horizontal reference plane.

A horizontal, circular filter disk 57 is attached—by means of supports 6*a* and 6*b*—to the mirror 55 and its mounting plate 32. The positioning of the filter disk 57 is such that its center coincides with the common rotational axis of the antenna 1 and the mirror 57. The filter disk 57 is divided into three concentric regions 64*a*, 63 and 62 —analogous to the regions 64, 63 and 62, respectively, of FIG. 3—which are not visible in the elevational view of FIG. 6, but shown in FIG. 7.

While the filter disk 57 is analogous to filter disk 57 in FIG. 3, it differs therefrom in that the central, circular region 64*a* of the disk is in the form of an orifice machined through the dielectric material of the disk. The adjacent, concentric regions 63 and 62 are formed by parallel conductors printed onto the surface of disk in mutually orthogonal arrays.

The entire rotating assembly—including the collector 2, the antenna 1, the mirror 55, the filter disk 57, and the various mechanical supporting elements interconnecting them with the turntable 17—is enclosed in a stationary housing constructed from a dielectric material, comprised of a circular base 131, a cylindrical shell 130, and cover 133 secured to the shell 130 at a flange 134.

A pair of microwave receiver horns, 108*a* and 128*a*, are mounted onto the inner surface of the cover 133 and project downwardly through disk orifice 64*a* and face the reflecting surface of the mirror 55. The two microwave receivers are of a circularly polarized construction and are equally sensitive to microwave radiation in all polarized states, except for opposite-sense circular polarization. The dimensionally smaller microphone horn 108A is optimally tuned for a higher frequency than the similar, but larger, microwave receiver 128*a*. Suitably, the receiver 108*a* is sensitive to the 26–40 GHz band, while the receiver 128*a* is sensitive in the 18–26 GHz band.

The outer region 62 of the filter disk is surmounted by receiver horns 108*b*/128*b* (not shown in FIG. 6 but shown in FIG. 7), while the intermediate region 63 is surmounted by receiver horns 108*c*/128*c*. These receivers are also supported by the cover 133 and are positioned with the lips of their sensing horns proximate to, but not touching, the moving surface of the filter disk 57.

The energy derived from an incident microwave beam reflected by the mirror 55 into the receivers 108 is conveyed through a network of wave guides and cavity switches—whose arrangement will be explained herein-below with reference to FIG. 7—to an output waveguide 119, terminating at an instrumentation flange 129. The signal is directed from the connection 129 to any desired measuring or analytical device for further processing.

Figure 7:
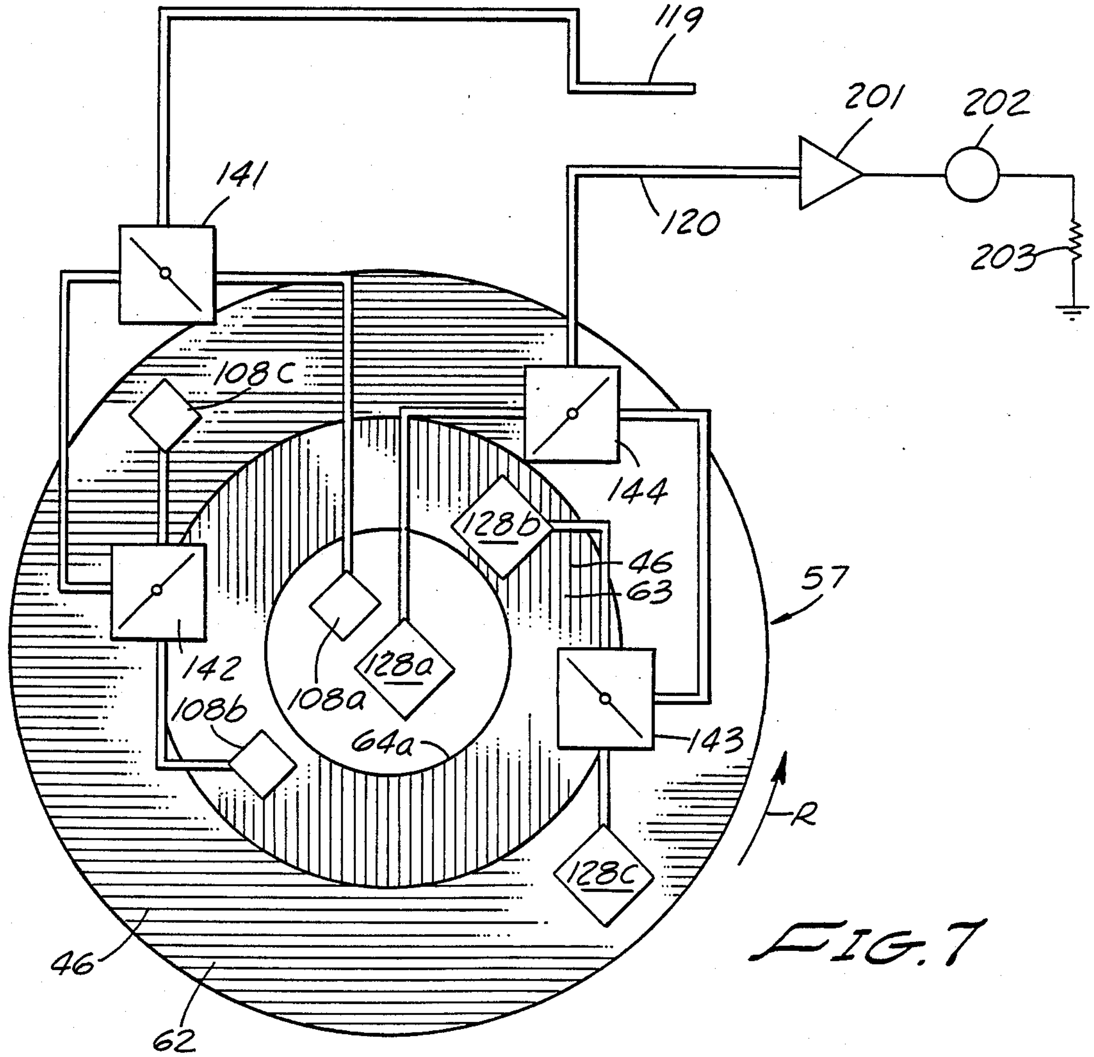
FIG. 7 is a plan view of the filter disk and collector array associated with the embodiment of FIG. 6.

FIG. 7 is a schematic plan view of the filter disk 57 as well as the components associated therewith and secured to the cover 133. The disk 57, as previously discussed, is divided into three concentric regions; a central orifice 64*a;* an inner annular region 63; and an outer annular region 62. The regions 63 and 62 are defined by arrays of identically dimensioned and spaced parallel conductors—as shown in portions of disk 57 in the illustration—with the respective arrays in mutually orthogonal alignments.

Each region of the filter disk is surmounted by two microwave receivers—in the form of circularly polarized horns which exhibit no preferential sensitivity to particular directions of polarization in the signal presented to them. For each region of the filter disk 57 there are two similar receivers provided which are sensitive to distinct frequency bands; receivers 108 respond to shorter wavelengths than receivers 128, which have larger physical dimensions.

The particular receivers, 108*a* and 128*a,* provided to receive microwave radiation aimed through the open central orifice 64*a* of the filter disk after reflection from the mirror 55 are placed so that they project into the opening of the central orifice 64*a.* The receivers associated with regions 63 and 62—108*b* and 128*b* above the inner annulus 63, and 108C and 128C above the outer annulus 62—are mounted with their entrance openings spaced from the upper surface of the disk 57 by a small distance for mechanical clearance.

As discussed above, the synchronous rotation of the disk 57 with the mirror 55 ensures that the receivers will at all times be exposed to, respectively, the horizontally and vertically polarized components of the incoming signal.

Figure 5:
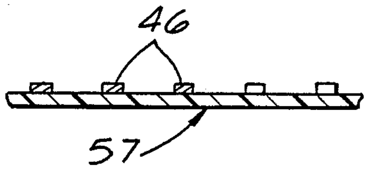
FIG. 5 is an enlarged section taken along line 5—5 of FIG. 4.

The microwave energy impinging on the several receivers 108 and 128 is channelled toward output lines 119 and 120 by means of waveguides—shown in the illustration but left unindexed—which are interrupted by switches 141, 142, 143 and 144. Each of the aforementioned switches is equivalent to a single-pole-double-throw electrical switching device and can be reset by remote control from one position to the other. The particular configuration of switches shown in FIG. 5 permits any one of the three receivers in each frequency band to be connected to each of the two output lines 119 and 120 at any given time. In the state illustrated, it is the higher frequency, K-band receiver 08A, in the unfiltered signal region 64*a,* which is connected to output line 119, while the A-band receiver 128A is connected to output line 120.

FIG. 7 also illustrates one method, in a modern microwave receiver, for measuring the signal strength collected by a particular sensor in the improved microwave receiver of the invention, by the interposition of a microwave diode 201—shown communicating with output line 120—between an ammeter 202, and an electrical load 203.

The configuration of switching elements illustrated in FIG. 7 permits rapid switching between specific receivers in the sensing array, but does not permit the parallel transmission of two or more signals to recording or analytical devices. It is contemplated that alternate arrangements for conveying the received signals may be employed and are encompassed in the scope of the invention; specific configurations may be readily defined by those skilled in the art, once exposed to the teachings herein. Similarly, it is contemplated that minor variations in the dimensions, arrangements or method of manufacture of the several components in the polarization-sensitive microwave receiver of the invention are deemed encompassed by the disclosure and description of the preferred embodiment hereinabove.

That which is claimed is:

1. An improved microwave receiver for microwave radiation sensitive to the polarization of the incoming signal, comprising:

a planar reflecting mirror for reflecting received microwave radiation and being rotatable around a principal axis and aligned at substantially 45 degrees with respect thereto;

a flat, polarizing filter, constructed from a material substantially transparent to microwave radiation, said filter being substantially in orthogonal alignment with, and substantially centered on, said principal axis of rotation, and said filter being in the path of radiation reflected from said planar reflecting mirror and synchronously driven with respect thereto;

a first, circular, transmitting region in said polarizing filter, substantially centered on said axis of rotation;

a second, annular, partially transmitting region abutting on said first region, defined by a plurality of substantially parallel, electrically conductive, grid lines substantially opaque to microwave radiation;

a third, annular, partially transmitting region abutting on said second region and positioned radially outwardly therefrom, defined by a plurality of substantially parallel, electrically conductive, striations substantially opaque to microwave radiation, with said striations aligned at substantially right angles with respect to said grid lines;

first receiver means, positioned behind the face of said polarizing filter remote from said planar reflecting mirror and aligned to receive radiation reflected therefrom through said first region of the polarizing filter;

second receiving means, positioned behind the face of said polarizing filter remote from said planar reflecting mirror and aligned to receive radiation reflected therefrom through said second region of the polarizing filter; and third receiver means, positioned behind the face of said polarizing filter remote from said planar reflecting mirror and aligned to receive radiation reflected therefrom through said third region of the polarizing filter.

2. The microwave receiver of claim 1, wherein said parallel grid lines are also substantially parallel to elements of said planar reflecting mirror orthogonal to said principal axis of rotation.

3. The microwave receiver of claim 2, additionally comprising drive means for entraining said mirror and said filter disk into synchronized rotation about said principal axis of rotation.

4. The microwave receiver of claim 3, further comprising a parabolic antenna for microwave radiation and having front, focusing surface and a rear, non-focusing surface said planar reflecting mirror being mounted on the rear surface of the parabolic antenna.

5. The microwave receiver of claim 3, additionally incorporating means for measuring signal strengths received by said first, second and third receiver means.

6. The microwave receiver of claim 5, wherein said means for measuring signal strengths includes at least one measurement channel, with such measurement channel including:

waveguide means for conveying microwave radiation sensed by said receiver means;

a microwave diode communicating with the output end of said waveguide means; and a microammeter connected to the output of said diode.

7. The microwave receiver of claim 1, wherein said parallel grid lines are parallel to said principal axis of rotation.

8. The microwave receiver of claim 1, wherein said first, transmitting region in said filter is small in radial extent, and said first receiver means is omitted.

9. The microwave receiver of claim 1, wherein the width of each of said grid lines and each of said striations is small compared to the wavelength of the incoming microwave signal and wherein the distance between longitudinal center lines of adjacent grid lines and between longitudinal center lines of adjacent striations is large compared to the width of each of said grid lines and each of said striations.

10. The microwave receiver of claim 9, wherein the width of each of said grid lines and each of said striations is between about 0.005 inch and about 0.025 inch, and wherein the distance between longitudinal center lines of adjacent grid lines and between longitudinal center lines of adjacent striations is between about 0.030 inch and 0.100 inch.

11. An improved microwave receiver for microwave radiation sensitive to the polarization of the incoming signal, comprising:

an antenna for transmitting and receiving microwave radiation having vertical and horizontal components and having a front, focusing surface and a rear, non-focusing surface;

a planar reflecting mirror for reflecting received microwave radiation and being rotatable around a principal axis common to the antenna and aligned at substantially 45 degrees with respect thereto and being mounted on the rear surface of the antenna;

a flat, polarizing filter, constructed from a material substantially transparent to microwave radiation, said filter being substantially in orthogonal alignment with, and substantially centered on, said principal axis of rotation, and said filter being in the path of radiation reflected from said planar reflecting mirror and synchronously driven with respect thereto;

a first, circular, transmitting region in said polarizing filter, substantially centered on said axis of rotation;

a second, annular, partially transmitting region abutting on said first region, defined by a plurality of substantially parallel, electrically conductive, grid line substantially opaque to microwave radiation;

a third, annular, partially transmitting region abutting on said second region and positioned radially outwardly therefrom, defined by a plurality of substantially parallel, electrically conductive, striations substantially opaque to microwave radiation, with said striations aligned at substantially right angles with respect to said grid lines;

first receiver means, positioned behind the face of said polarizing filter remote from said planar reflecting mirror and aligned to receive radiation reflected therefrom through said first region of the polarizing filter;

second receiver means, positioned behind the face of said polarizing filter remote from said planar reflecting mirror and aligned to receive radiation reflected therefrom through said second region of the polarizing filter; and third receiver means, positioned behind the face of said polarizing filter remote from said planar reflecting mirror and aligned to receive radiation reflected therefrom through said third region of the polarizing filter;

wherein the second and third partially transmitting regions filter the received microwave signal into its horizontal and vertical components; and means for comparing the radiation received by the first , second and third receiver means.

12. The microwave receiver of claim 11, wherein said parallel grid lines are also substantially parallel to elements of said planar reflecting mirror orthogonal to said principal axis of rotation.

13. The microwave receiver of claim 12, additionally comprising drive means for entraining said mirror and said filter disk into synchronized rotation about said principal axis of rotation.

14. The microwave receiver of claim 13, wherein said antenna is a parabolic antenna.

15. The microwave receiver of claim 13, additionally incorporating means for measuring signal strengths received by said first, second and third receiver means.

16. The microwave receiver of claim 15, wherein said means for measuring signal strengths includes at least one measurement channel, with such measurement channel including:

waveguide means for conveying microwave radiation sensed by said receiver means;

a microwave diode communicating with the output end of said waveguide means; and a microammeter connected to the output of said diode.

17. The microwave receiver of claim 11, wherein said parallel grid lines are parallel to said principal axis of rotation.

18. The microwave receiver of claim 11, wherein said first, transmitting region in said filter is small in radial extent, and said first receiver means is omitted.

19. The microwave receiver of claim 11, wherein the width of each of said grid lines and each of said striations is small compared to the wavelength of the incoming microwave signal and wherein the distance between longitudinal center lines of adjacent grid lines and between longitudinal center lines of adjacent striations is large compared with the width of each of said grid lines and each of said striations.

20. The microwave receiver of claim 19, wherein the width of each of said grid lines and each of said striations is between about 0.005 inch and about 0.025 inch, and wherein the distance between longitudinal center lines of adjacent grid lines and between longitudinal center lines of adjacent striations is between about 0.030 inch and 0.100 inch.

* * * * *